July 16, 1968  W. M. SCHWARTZ, JR  3,392,662
COFFEE PERCOLATOR
Filed Oct. 31, 1966
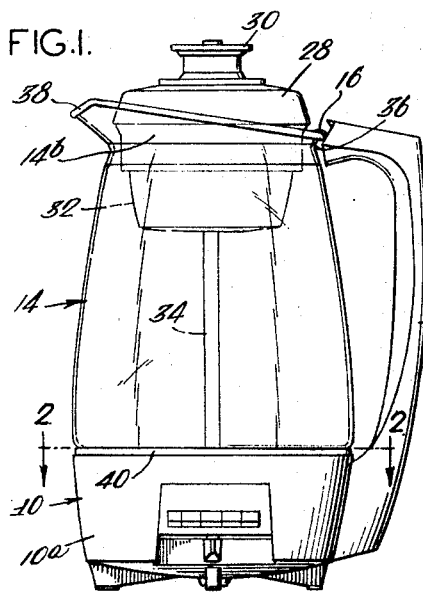
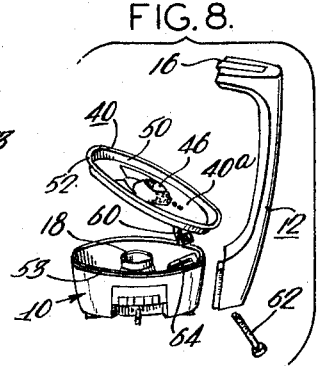
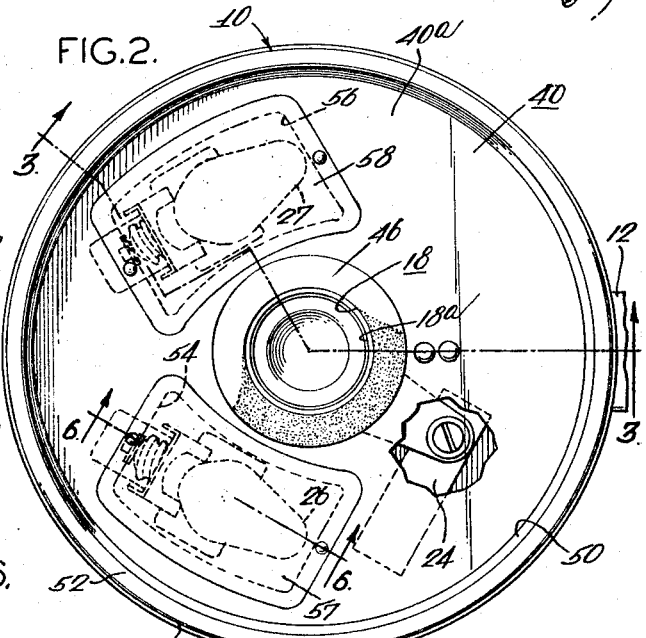
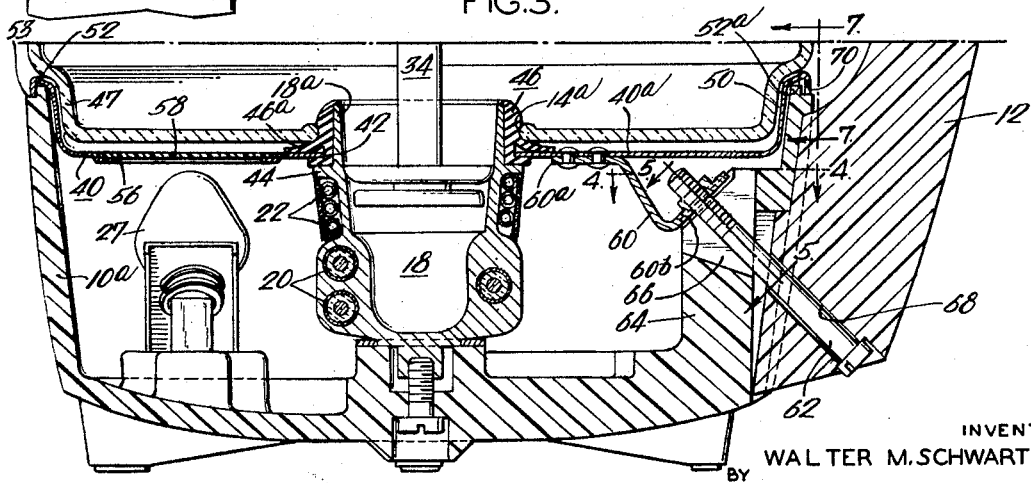
INVENTOR:
WALTER M. SCHWARTZ, JR.
BY Howson & Howson
ATTYS.

United States Patent Office 3,392,662
Patented July 16, 1968

3,392,662
COFFEE PERCOLATOR
Walter M. Schwartz, Jr., Philadelphia, Pa., assignor to Proctor-Silex Incorporated, Philadelphia, Pa., a corporation of New York
Filed Oct. 31, 1966, Ser. No. 590,642
19 Claims. (Cl. 99—285)

ABSTRACT OF THE DISCLOSURE

An electric percolator is provided having a base with a peripheral wall and liquid retaining means supported on the base extending between the peripheral wall of the base, the liquid retaining means being a closure for the base in the form of a shallow well at the top of the base. A container for liquid is provided having a lip for pouring liquid from the container. Means is employed for supporting the container on the base and providing an opening between the container and base such that a clearance is provided between the base and the container for drops of liquid which flow down the outside of the container from the lip to flow between the container and base and onto the liquid retaining means.

---

The present invention relates to a coffee percolator and, more particularly, to improvements in the construction of a support base on which a container for liquid is mounted. More specifically, the present invention concerns an improved coffee percolator whereby drops of liquid which may flow down the outside of the container after pouring liquid therefrom are prevented from flowing down the outside of the support base.

The present invention is primarily concerned with coffee percolators of the type which have a glass or ceramic container for liquid and a support base on which the container is mounted. The support base generally includes a heat-pump well and associated circuitry for causing percolation of the liquid in the container. In prior art percolators having ceramic containers for liquid including containers of vitreous material, the containers have been either fixed to the base in a stationary manner or held on the base in a releasable manner, such as disclosed in U.S. Patent No. 3,282,196, entitled "Coffee Percolator" of Manship et al., and of common assignee herewith. The invention disclosed in that patent has many advantages as pointed out therein, the present invention being an improvement thereon.

In either type percolator with the container mounted on the base, sealing means is provided between the outer periphery of the base and the container to prevent leakage of liquid between the container and base. The ceramic container of the percolator is generally provided with an integral pouring lip or spout. Unlike metal containers for liquid, which can be designed with a pouring spout of an elaborate shape and a sharp edge, ceramic containers are not adapted to be made with elaborate and sharp-edged pouring lips since such an arrangement would greatly weaken the container and would be costly to manufacture. Preferably, in order to strengthen the ceramic container, a rounded edge is provided for the pouring lip. With glass containers which are blown and flame polished for strengthening, it is undesirable to modify the polished surfaces.

It has been found that when liquid is poured from the pouring lip of percolators having ceramic containers, there is a tendency for the last increment of liquid, which flows over the lip as pouring is completed, to flow down the outside of the container. With the container and base sealed together at their periphery, any drops of liquid which flow down the outside of the container will flow down the support base and onto the tablecloth or other article on which the percolator base is thereafter rested. Consequently, a stain or undesired spot is produced by such drops of liquid after a pouring operation from the container. Also, in coffee percolators which are adapted to have the ceramic container removable from the base, as disclosed in the above-identified patent, it may become very difficult to remove the container from the base. This problem occurs because the drops of coffee which flow down the outside of the container and seep between the container and sealing ring around the base act as an adhesive to hold the sealing ring to the ceramic container, whereas the sealing ring is designed to remain with the base upon removal of the ceramic container. The adhesive action of the coffee between the container and seal associated with the base tends to make removal of the container from such percolators awkward and difficult, occasionally resulting in breakage of the container.

Accordingly, it is desirable to provide means for preventing drops of liquid from flowing down the outside of the container and base and onto an article on which the percolator base is rested after a pouring operation. Also, it is desirable to provide a base which is sealed across its top so that coffee is prevented from leaking into the base which contains electrical circuitry. In addition, it is desirable to have the means for closing the opening of the base easily removable so that access may be readily provided to the base for repairing or replacing defective parts in the base.

In accordance with the present invention, a liquid retaining closure is supported on the base extending between the centrally located heat-pump well in the base and the peripheral wall of the base. The container for liquid is provided with an opening in the bottom thereof adapted to communicate with the heat-pump well. There is provided means for supporting the container adjacent the heat-pump well and in sealing relationship with the walls of the heat-pump well such that a clearance is provided between the base and the container for drops of liquid which flow down the outside of the container from the pouring lip to flow between the container and base and onto the liquid retaining closure. In a preferred form of the invention, the liquid retaining closure provides a shallow well at the top of the base extending between the peripheral wall of the base and the heat-pump well to retain drops of liquid which flow down the container. Preferably, releasable fastening means is employed for coupling the closure to the base so that the closure may be easily removed from the base to provide easy access into the base for repair or replacement of parts.

For a better understanding of these and other features and advantages of the present invention, reference is made to the following drawings, in which:

FIG. 1 is a side elevational view of a coffee percolator embodying the present invention;

FIG. 2 is an enlarged view taken along line 2—2 of FIG. 1 with the container for liquid omitted and a portion of the handle broken away;

FIG. 3 is an enlarged fragmentary sectional view taken along line 3—3 of FIG. 2 and showing portions of the container and fountain tube in their relation to the base;

FIG. 4 is a fragmentary sectional view taken along line 4—4 of FIG. 3;

FIG. 5 is a fragmentary sectional view taken along line 5—5 of FIG. 3;

FIG. 6 is a fragmentary sectional view taken along line 6—6 of FIG. 2;

FIG. 7 is a fragmentary sectional view taken along line 7—7 of FIG. 3; and

FIG. 8 is an exploded perspective view at a reduced scale of the percolator base, base closure and handle.

Referring to FIGS. 1–3, there is illustrated a percolator having a ceramic container for liquid mounted on a support base. The percolator shown in FIGS. 1–3 employs many features which are similar to features shown and described in the above-identified patent of Manship et al. It should be understood by those skilled in the art that percolators of other constructions, having a ceramic container for liquid and support base associated therewith, may employ the liquid retaining means between the container and base in accordance with the present invention.

The percolator shown in FIGS. 1–3 and 8 comprises a generally cylindrical hollow cup-shaped base 10, a separate handle 12 secured to the base and extending upwardly from one side thereof, and a ceramic container 14, preferably constructed of heat-resistant glass. The container 14 for liquid is supported on base 10 and is clamped into position by latch means generally designated 16 in the upper portion of handle 12. A cup-shaped heat-pump well 18 is centrally positioned in the base. The upper lip of the heat-pump well provides a collar 18a which extends upwardly into container 14 through an aperture 14a centrally located in the bottom of the container. Two resistance heaters 20 and 22 are incorporated in and around the sidewalls of heat-pump well 18 and electrically insulated therefrom but in heat transfer relationship with the well. Primary heater 20 is adapted to perform the percolating operation, secondary heater 22 is provided to maintain the brewed coffee at a predetermined temperature after percolation is completed. A thermostatic control switch generally designated 24 is provided in the electrical circuit of the percolator for regulating the heating operation. A pair of electric lamps 26 and 27 are preferably supported in sockets in the base and connected in the electrical circuit of the percolator in a conventional manner.

The glass container 14 is provided with an inverted cup-shaped lid 28 of sheet metal surmounted by a knob 30. The lid 28, which nests within a divergently outwardly flared collar 14b of the glass container, encloses the top portion of a coffee basket 32 located in the container. A fountain tube 34 extends downwardly from basket 32 to the heat-pump well of the base. The container fits within the sidewall 10a of the base adjacent the top opening of the base and extends upwardly from the base to collar 14b, which has a narrow width portion 36 at the point of engagement with the latch means 16 in the handle and a pouring lip or spout 38 opposite portion 36. For a more detailed discussion of the percolator structure briefly described above, reference is made to the above-identified patent of Manship et al.

In percolators of the type described above, when pouring coffee from the container during a pouring operation, the last increment of coffee discharged over the lip tends to flow around the rounded edge of the lip and down the under surface of the lip. Such drops of coffee flow down the outside of the container, over the support base and onto the article on which the base is rested after the pouring operation. The lip of the ceramic container cannot practically be provided with a sharp edge to enable a more effective cut-off of the coffee stream so that the last increment of coffee discharged over the rounded edge of the lip flows down the outside of the container due to capillary action of the liquid. According to the present invention, in order to prevent drops of coffee, which flow down the outside of the container, from flowing over the base, liquid retaining means is provided within the top opening of the base and any sealing means between the peripheral wall of the base and the container, as disclosed in the prior art, is eliminated.

In the preferred form of the invention, the liquid retaining means is characterized by a liquid retaining closure providing a shallow well at the top of the base and extending between the peripheral wall of the base and the heat-pump well. More specifically, as shown in FIGS. 2, 3 and 8, the liquid retaining closure is provided by a pan 40 which is generally annular in form and has a central circular opening 42 to permit pan 40 to encircle collar 18a of the heat-pump well 18. The central edge of pan 40 bounding the well 18 seats on an annular flange 44 of the well. Preferably, an annular rubber sealing member 46 fits snugly over collar 18a and abuts flange 44 of the heat-pump well. The sealing member 46 also provides a flap 46a which overlaps and seats on the upper surface of pan 40, as shown in FIG. 2. The outside of sealing member 46 together with flap 46a is generally conical in form and is adapted to support the container along its conical sides at the rim bounding the bottom opening 14a of the container. The bottom of the container is located in this arrangement a distance above the central portion 40a of pan 40, so that a clearance is provided between the pan and bottom of the container. The container has a reduced diameter upwardly extending portion 47 adjacent its bottom to provide a clearance between the upwardly extending sides of the container and upwardly extending sidewall 10a of the base 10.

As shown in FIGS. 2 and 3, pan 40 extends from sealing member 46 adjacent the heat-pump well to adjacent sidewall 10a of the base and is provided with an upwardly turned flange 50, serving as a steep wall adjacent the inner surface of the sidewall of the base. Flange 50 has an outwardly and downwardly turned rim portion 52 which overlaps the top of sidewalls 10a of the base to provide a recess 52a adapted to receive an upwardly extending top portion 10b of sidewalls 10a, so that the top 10b of sidewalls 10a is received in rim portion 52, which abuts against a shoulder 53 around the periphery of the top of sidewall 10a to support the plate on the base. By this arrangement, pan 40 provides a shallow well in the top of base 10 and closes the top opening of the base between sidewalls 10a and heat-pump well 18, in conjunction with sealing member 46 surrounding the heat-pump well, to prevent leakage of liquid into the base. The container 14 supported by rubber sealing member 46 has its bottom a distance above the central portion 40a of pan 40 to provide a clearance therebetween, and the reduced diameter portion 47 of the container is adapted to fit within upstanding wall 50 of pan 40 such that a clearance is provided between wall 50 and the container, as shown in FIG. 3. The clearance provided between the bottom portion of the container and shallow-well pan is employed to permit drops of liquid which may flow down the container from its lip to flow between the container and shallow-well pan. In this arrangement, such drops of liquid flow between the container and base and are received by the shallow-well pan to prevent the drops of liquid from flowing down the outside of sidewall 10a of the base.

As shown in FIGS. 3 and 6, central portion 40a of pan 40 is provided with two openings 54 and 56 spaced angularly around the central portion between central opening 42 and flange 50. The openings 54 and 56 are adapted to lie directly over the electric lamps 26 and 27, respectively, supported in the base, so that the lamps may illuminate the liquid in the glass container 14. The openings 54 and 56 in the pan are bounded by depressed rims adapted to support thin translucent members 57 and 58, respectively, which close openings 54 and 56, the translucent members being secured to the rims as by rivets. Preferably, a sealing material, such as silicone cement, may be placed between the translucent members and the rims for sealing therebetween so that liquid is prevented from leaking through the openings around the translucent members, which are adapted to diffuse the light from the lamps.

With the closure pan 40 seated on the base between the heat-pump well and sidewalls, releasable fastening means is provided for coupling the pan to the base and permitting easy removal of the pan to provide access into the base for replacing the lamps or other components which may become defective. As shown in FIGS. 3, 4 and 5, the fastening means is provided by a connecting member or bracket 60 to couple the connecting member and base together. More specifically, the connecting bracket is fabricated in an irregular shape having one end 60a secured to the under surface of the pan 40 as by rivets and its other end 60b adapted to extend adjacent a vertically extending rib 64 of the base. End 60b of bracket 60 is provided with a threaded opening communicating with an opening 66 through rib 64 and sidewall 10a of the base. Handle 12 is provided with an opening 68 adjacent its bottom to communicate with opening 66 in the base, so that the fastening member, shown as screw 62, may extend through openings 66 and 68 and be threaded in the opening in end 60b of bracket 60. Screw 62 serves to hold the handle fixed to the base and the pan fixed on the base. As shown in the exploded perspective view of FIG. 8, upon removal of the screw 62 from bracket 60 of the pan, the handle and pan may be separated from the base. Since the sealing member 46 has, radially extending portions on opposite sides of the pan adjacent the pan's central opening, the sealing member is adapted to remain with the pan when it is separated from the base. To enable easy separation of the pan from the base when screw 62 is removed from bracket 60, a recess 70 may be provided in rim portion 52 of pan 40, as shown in FIG. 7, so that means, such as a coin, may be inserted in recess 70 between rim 52 and shoulder 53 at the top of sidewall 10a to pry the rim upwardly from the sidewall of the base separating the pan from the base.

In accordance with the preferred arrangement of the liquid retaining pan 40 and container 14, the container, which has its lower portion of a similar shape to the shallow-well pan but of reduced dimension, is supported by sealing member 46 a distance above the shallow-well pan 40. The clearance between the container and pan is preferably such that any drops of coffee which flow down the outside of the container from the lip after a pouring operation will flow between the container and base to wet the bottom surface of the container and the surface of the pan. Drops of coffee which flow between the container and pan will flow down into the shallow-well pan and be prevented from flowing down the sidewalls 10a of the base. By having the drops of liquid wet both the surfaces of the container and pan, the capillary action of the liquid between the surfaces will further inhibit the water from flowing out of the shallow well of the pan upon subsequent pouring operations of coffee from the container.

In accordance with present percolators, any drops of liqiud flowing between the container and pan will either flow onto or drip onto the pan. With the pan located on the base adjacent the heat-pump well, the pan is heated to temperatures in the range of 200° F. during the percolation and warming operations of the coffee. Consequently, drops of coffee which flow or drip onto the heated pan are generally evaporated due to the temperature of the pan. In this manner, the drops of coffee which flow onto the pan are retained by the shalow-well pan and are generally evaporated therefrom, so that upon subsequent pouring operations any of the drops of coffee on the pan are prevented from flowing out of the shallow well of the pan.

It will be observed that in accordance with the present invention an improved percolator structure is provided for preventing drops of liqiud from flowing down the outside of the percolator and onto the article on which the percolator is rested after pouring coffee therefrom. The liquid retaining closure over the base in accordance with the present invention may be simplified and inexpensively manufactured and is easily assembled into the percolator structure. The liquid retaining closure is releasably fastened to the base in such a manner that, when the container is removed from the base, the liquid retaining closure may be easily removed to provide access into the base for repair or replacement of parts. Moreover, the present invention provides sealing and closing of the top opening of the base between the sidewalls of the base and heat-pump well to revent leakage of liquid into the base.

While the present invention has been described with particular reference to a specific embodiment thereof, it will be understood that it may be embodied in large variety of forms different from the ones specifically shown and described without departing from the scope and spirit of the invention as defined by the appended claims.

What is claimed is:

1. An electric percolator comprising: a base having a peripheral wall; liquid retaining means supported on the base and extending between the peripheral wall of the base; a container for liquid having a lip for pouring liquid from the container; and means for supporting the container on the base and providing an opening between the container and base such that a clearance is provided between the base and the container for drops of liquid which flow down the outside of the container from the lip to flow between the container and base and onto the liquid retaining means.

2. The percolator of claim 1 in which the liquid retaining means comprises a closure for the base providing a shallow well at the top of the base and extending between the peripheral wall of the base to retain drops of liquid which flow down the container.

3. The percolator of claim 1 in which the liquid retaining means comprises a closure for the base, the percolator further comprising a connecting member supported by the closure and releasable fastening means coupled between the connecting member and the base for releasably holding the closure to the base.

4. An electric percolator comprising: a base having a peripheral wall; a centrally located member in the base having walls defining a heat-pump well; liquid retaining means supported on the base and extending between the heat-pump well and peripheral wall of the base; a container for liquid having an opening in the bottom thereof adapted to communicate with the well and having a lip for pouring liquid from the container; and means for supporting the container adjacent the well and in sealing relationship with the walls of the heat-pump well and providing an opening between the container and base such that a clearance is provided between the base and the container for drops of liquid which flow down the outside of the container from the lip to flow between the container and base and onto the liquid retaining means.

5. The percolator of claim 4 in which the liquid retaining means comprises a closure for the base providing a shallow well at the top of the base and extending between the walls of the base and the walls of the heat-pump well to retain drops of liquid which flow down the container.

6. The percolator of claim 4 in which the means for supporting the container on the base includes a sealing member between the container and heat-pump well adapted to support the container so that its bottom surface is a predetermined distance above a surface of the liquid retaining means, the liquid retaining means and bottom of the container being in spaced relation such that drops of liquid which flow down the outside of the container from the lip will flow between the container and liquid retaining means to wet the bottom of the container and the liquid retaining means.

7. An electric percolator comprising: a base having a peripheral wall; a centrally located member in the base having walls defining a heat-pump well; a closure supported on the base having an upwardly extending peripheral portion to extend adjacent the wall of the base and having an opening communicating with the well; sealing means between the closure and the well; a container for liquid having an opening in the bottom thereof communicating with the heat-pump well and having a lip for pouring liquid from the container; and means for supporting the container adjacent the heat-pump well and in sealing relationship with the walls of the heat-pump well and providing an opening between the container and base such that a clearance is provided between the base and the container for drops of liquid which flow down the outside of the container from the lip to flow between the container and base and be received by the closure.

8. The percolator of claim 7 in which the peripheral portion of the closure is provided with a flange overlapping the wall of the base at its top so that the closure receives the wall of the base.

9. The percolator of claim 7 in which the sealing means supports the container on the heat-pump well such that the bottom of the container and closure are in spaced relationship; the container being supported above the closure a distance so that drops of liquid which flow down the outside of the container from the lip will flow between the container and closure to wet the bottom of the container and the closure.

10. The percolator of claim 7 further comprising releasable fastening means for releasably coupling the closure to the base.

11. The percolator of claim 7 further comprising a connecting member supported by the closure, and releasable fastening means coupled between the connecting member and the base for releasably holding the closure to the base.

12. An electric percolator comprising: a base having a peripheral wall; a centrally located member in the base having walls defining a heat-pump well; a pan supported on the base having a peripheral wall extending adjacent the wall of the base and having an opening communicating with the well; sealing means between the pan and the heat-pump well; a removable container for liquid having an opening in the bottom thereof communicating with the heat-pump well and having a lip for pouring liquid from the container; and means for holding the container adjacent the heat-pump well and in sealing relationship with the walls of the heat-pump well and providing an opening between the container and base such that a clearance is provided between the base and the container for drops of liquid flowing down the outside of the container to flow between the container and base and be received by the pan.

13. The percolator of claim 12 further comprising releasable fastening means for releasably coupling the pan to the base.

14. The percolator of claim 13 in which the base has at least one electric lamp mounted therein and operatively connected in a circuit, and the pan is provided with at least one opening cooperable with the lamp to permit light to impinge upon the container; and in which a translucent member is provided for closing the last-mentioned opening in the pan, and means is provided for sealing the translucent member to the pan so that liquid is prevented from passing through the last-mentioned opening in the pan.

15. The percolator of claim 12 in which the peripheral wall of the pan has a flange which overlaps the wall of the base at its top so that the pan receives the wall of the base.

16. The percolator of claim 15 in which the flange is provided with a recess at its periphery adapted to be adjacent the top portion of the wall of the base when the pan is seated on the base so that means may be inserted in the recess for moving the flange upwardly from the top portion of the base to separate the pan from the base.

17. The percolator of claim 12 further including a connecting member supported by the pan, and releasable fastening means coupled between the connecting member and the base for releasably holding the pan to the base.

18. The percolator of claim 12 in which the peripheral wall of the pan extends upwardly and has a downwardly turned flange to provide a recess adapted to receive the wall of the base around its top portion so that the base is sealed between its wall and heat-pump well to prevent leakage of liquid into the base from its top.

19. An electric percolator comprising: a base having a peripheral wall; liquid retaining means supported on the base and extending between the peripheral wall of the base; a container for liquid having a bottom portion and having a lip for pouring liquid from the container; and means for supporting the container on the base spaced from the peripheral wall of the base at least over a substantial portion of the periphery of the bottom portion of the container such that a clearance is provided between the base and the container for drops of liquid which flow down the outside of the container from the lip to flow onto the liquid retaining means between the container and base; the liquid retaining means being spaced from the bottom portion of the container for receiving the drops of liquid.

References Cited

UNITED STATES PATENTS

| | | | |
|---|---|---|---|
| 2,701,296 | 2/1955 | Crawford | 99—310 |
| 3,282,196 | 11/1966 | Manship et al. | 99—310 |

FOREIGN PATENTS

| | | |
|---|---|---|
| 610,074 | 3/1935 | Germany. |

WILLIAM I. PRICE, *Primary Examiner.*